United States Patent Office 3,623,357
Patented Nov. 30, 1971

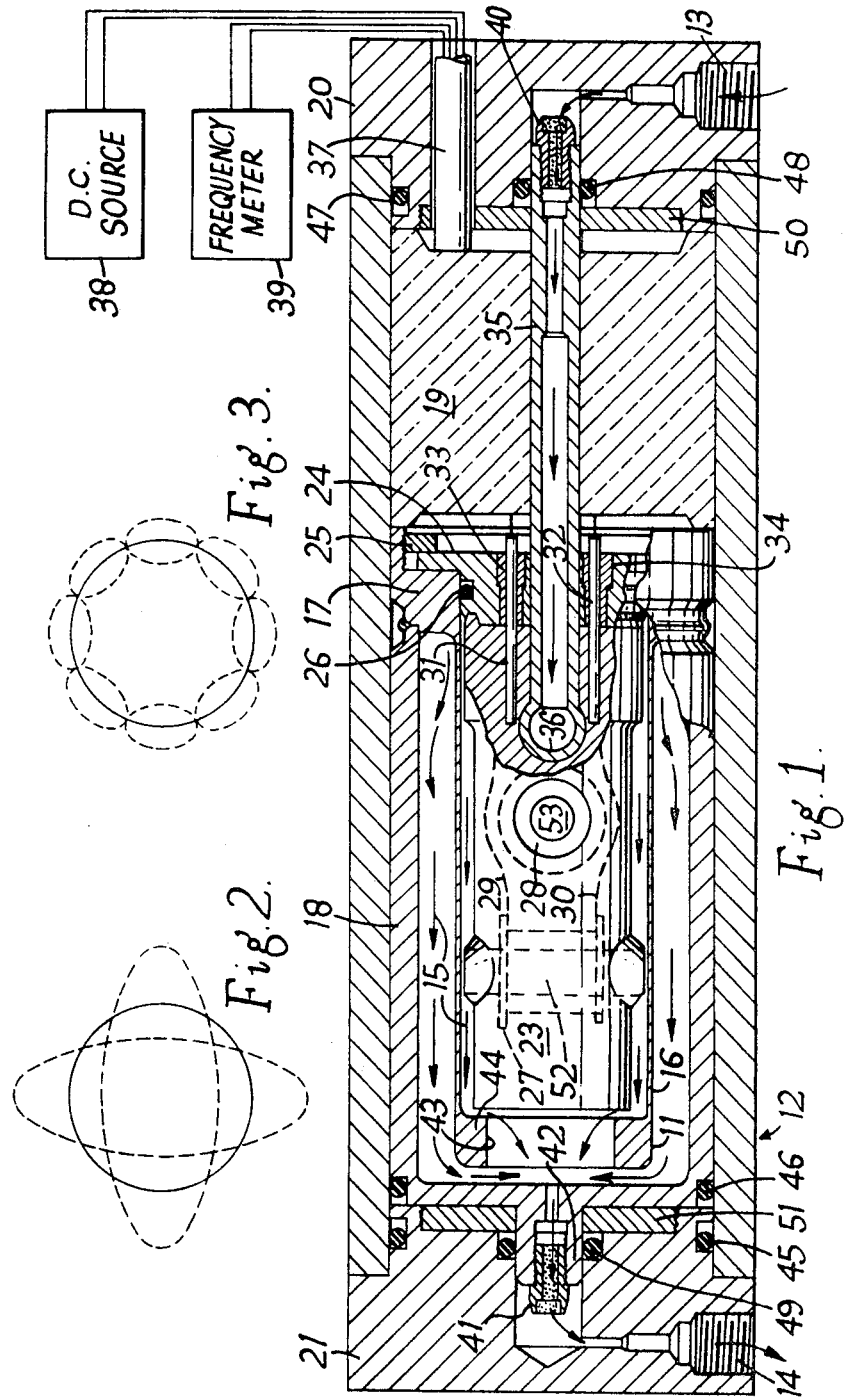

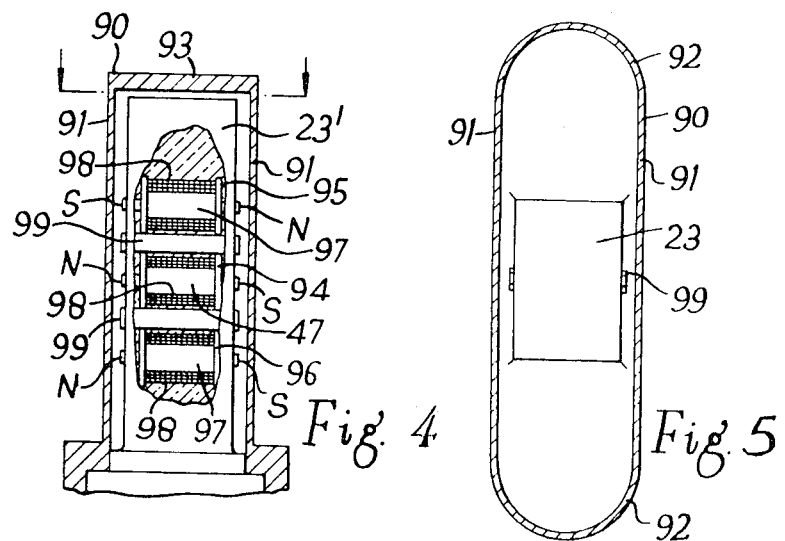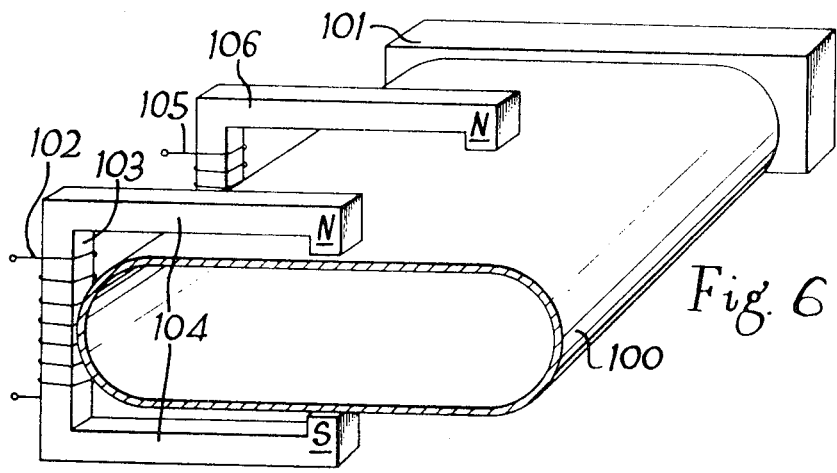

3,623,357
APPARATUS FOR MEASURING THE
DENSITIES OF FLUIDS
William Edward Abbotts, Farnborough, England, assignor to The Solartron Electronic Group Limited, Farnborough, England
Original application Jan. 25, 1967, Ser. No. 611,632, now Patent No. 3,516,283, dated June 23, 1970. Divided and this application Jan. 28, 1970, Ser. No. 888,101
Claims priority, application Great Britain, Jan. 28, 1966, 4,042/66
Int. Cl. G01n 9/00
U.S. Cl. 73—32                    5 Claims

ABSTRACT OF THE DISCLOSURE

A density meter for measuring the density of a gas, having a hollow cylinder which is set into bell-like vibration when the gas is in contact with the cylinder both internally and externally to avoid differential pressure, or the cylinder walls are so thick that a gas or liquid can be applied to an internal or external surface alone, in each case the predeominant frequency being measured.

---

This is a division of Ser. No. 611,632 filed Jan. 25, 1967, now Pat. No. 3,516,283, dated June 23, 1970.

This invention relates to methods of measuring the densities of fluids and apparatus therefor.

It has been found that the frequencies of the natural bell-like vibrations excited when a hollow body of resilient material is, for example, struck vary with the density of a fluid which is in contact with a predetermined region of the hollow body. The predominant frequency of such vibrations, that is, the frequency of the vibrations containing most energy, is thus related to the density of such a fluid.

According to the present invention a method of measuring the density of a fluid comprises the steps of bringing the fluid into contact with a predetermined region of a hollow body formed of resilient material, exciting natural vibrations of the body, rendering a frequency of the vibrations substantially insensitive to variations in differential pressure exerted on the predetermined region at least within a given range of pressure and measuring the said frequency.

Also according to the present invention a density meter for measuring the density of a fluid includes a hollow body of resilient material, means for exciting natural vibrations of the hollow body, and means for generating a signal representative of a frequency the said vibrations, the hollow body being such as to permit the application of the fluid to at least part of a wall thereof, the wall being of such thickness that the said frequency is substantially insensitive to variations in differential pressure exerted thereon within a given range of pressure.

Further according to the present invention, a density meter for measuring the density of a fluid includes a hollow body of resilient material, means for exciting natural vibrations of the hollow body, and means for generating a signal representative of a frequency of the said vibrations, the hollow body being such as to permit application of the fluid to external and internal surfaces of the hollow body at equal pressures.

The invention will now be further described by way of example with reference to the accompanying drawings in which:

FIG. 1 shows partially in section a first embodiment of the invention;

FIG. 2 illustrates natural bell-like vibrations of the hollow body of the first embodiment;

FIG. 3 illustrates further natural bell-like vibrations of the hollow body of the first embodiment;

FIG. 4 is a partially sectional, simplified view of part of a second embodiment of the invention;

FIG. 5 is a cross-sectional view taken on the line 10–10′ of FIG. 4; and

FIG. 6 is a simplified perspective view of a third embodiment of the invention.

Referring to FIG. 1, there is shown a density meter for measuring the density of a gas. A cylindrical tube 11 formed of ferromagnetic metal, such as Ni-Span-C 902 (trademark), is secured within a chamber 12 having an inlet port 13 and an outlet port 14. The directions of flow of the gas in operation are indicated by arrows as, for example, at 15. The cylindrical wall 16 of the tube 11 is integral with a flange 17 which fits slidingly within the chamber 12. The flange 17 is located between a chamber-lining member 18, to which the flange 17 is welded, and an amplifier 19. The chamber-lining member 18 and the amplifier 19 also fit slidingly within the chamber 12. The ends of the chamber 12 are formed by tightly fitted end members 20 and 21.

A cylindrical supporting body 23 of thermoset synthetic resin bonded to a metal end plate 24 is located coaxially within the tube 11, a flange on the end plate 24 being held against the flange 17 by a retaining ring 25 screw-threadedly engaged in a skirt formed on the flange 17. An O-ring 26 provides a gas-tight seal between the end plate 24 and the inner surface of the tube 11.

A drive coil 27 and a pick-up coil 28 are so embedded in the body 23 that their axes are mutually perpendicular and are respectively perpendicular to the longitudinal axis of the tube 11. The body 23, the drive coil 27 and the pick-up coil 28 are arranged to be clear of the walls of the tube 11 in order that the tube may vibrate without striking the body 23 and the coils 27 and 28. Leads 29 and 30 from the output circuit of the amplifier 19 enter the body 23 through a conduit 31, leads (not shown) from the pick-up coil 28 to the amplifier 19 leave the body 23 through a further conduit 32. The conduits 31 and 32 are located in insulating bushes 33 and 34 in the end plate 24.

A metal pipe 35 extends from the end closure member 20, through the amplifier 19 and the end plate 24, and into the body 23 where a further pipe 36 is secured in communication therewith. The further metal pipe 36 lies with its axis parallel to the axis of the pick-up coil 28 and its ends are open so that the gas from the pipe 35 can flow into the space between the body 23 and the tube 11.

Small circular holes (not shown) formed in the wall 16 near to the flange 17 allow gas to pass from the space within the tube 11 to the space between the tube 11 and the chamber lining member 18.

A screened four-core cable 37 passes through the end-closure member 20 to the amplifier 19, two of the conductors of the cable serving to couple a DC source 38 to the amplifier 19, and the other two conductors serving to couple the output circuit of the amplifier to a frequency meter 39. The screen of the screened four-core cable 37 is electrically connected to the chamber 12 and to respective common-rail conductors of the amplifier 19 and the frequency meter 39.

In operation, gas flows from the inlet port 13 to the pipe 35 through a filter 40. Before leaving the chamber 12 by way of the outlet port 14, gas passes through a further filter 41. Each of the filters 40 and 41 comprises an externally screw-threaded body having a passage therethrough which houses a mass of sintered metal powder. The filter 40 is screw-threadedly engaged in one end of the pipe 35, and the filter 41 is screw-threadedly engaged in a tubular projection 42 integral with the chamber-lining member 18. Gas entering the space between the body 23 and the wall 16 from the tube 36 escapes from the said space both by way of the small holes in the wall 16 as mentioned hereinbefore and by way of a circular opening 43 in the end wall 44 of the tube 11 remote from the flange 17. The circular opening 43 is coaxial with the body 23 in order that gas may flow equally between the body 23 and the end wall 44 of the tube at all points of the gap between the end wall 44 and the body 23.

O-rings 45, 46, 47, 48 and 49 are included in the chamber 12 to provide gas tight seals. The O-rings 48 and 49 are retained within the end closure members 20 and 21 respectively by discs 50 and 51 respectively. The discs 50 and 51 are screw-threadedly engaged in the end closure members 20 and 21 respectively, and are provided with central apertures, the tubular projection 42 being located in the central aperture of the disc 51 and the tube 35 being located in the central aperture of the disc 50. The cable 37 passes through a further aperture in the disc 50.

The drive coil 27 and the pick-up coil 28 are provided with respective composite cores 52 and 53. Each composite core comprises a cylindrical permanent magnet equipped with soft iron pole pieces, the length of the magnet being approximately one seventh the length of each pole piece. The perpendicular relationship of the axes of the drive coil 27 and the pick-up coil 28 provides a low degree of direct coupling between the drive coil 27 and the pick-up coil 28.

In operation, natural bell-like vibrations of the tube 11 are excited and maintained by virtue of feedback from the pick-up coil 28 to the drive coil 27 through the amplifier 19. The vibrations are initiated by mechanical noise transmitted to the tube 11 or by electrical noise occurring in the drive coil 27 when the amplifier is switched into action. The end wall 44 and the flange 17 are sufficiently thick for nodes to be present at the ends of the tube 11 during such vibrations. FIGS. 2 and 3 illustrates two forms of such vibrations, FIG. 2 showing the form of the vibrations having the fundamental frequency. The continuous lines indicate the undisturbed cross-section of the cylindrical wall 16, the broken lines indicating extreme conditions of the wall 16 during natural bell-like vibrations in FIGS. 2 and 3. It will be realised that in practice, the natural bell-like vibrations may be a combination of the forms of vibration shown in FIGS. 2 and 3 and other such forms.

The predominant frequency of the natural bell-like vibrations of the tube 11 is measured by means of the electrical frequency meter 39, the frequency of the current supplied to the drive coil 27 being the same as the predominant frequency of the vibrations of the tube 11. The frequency meter 39 is a conventional electrical frequency meter adapted to cover the range of predominant frequencies anticipated for the operation of the density meter and can be calibrated to read directly in density units from a calibration graph prepared from frequencies obtained when the tube 11 is excited in contact with gases having standard densities.

The effect of the pressure of the gas on the predominant frequency of the vibrations of the tube 11 is negligible since the gas is applied both internally and externally to the tube 11. Pressure differences axially of the tube 11 associated with the flowing of the gas within the tube 11 and outside the tube 11 are arranged to be approximately the same magnitude so that substantially no pressure difference is set up across the cylindrical wall 16 and the end wall 44, in other words the differential pressure exerted on the region of the tube 11 into contact with which the gas is brought is maintained substantially constant at zero pressure. Thus the frequency of the natural bell-like vibrations of the tube 11 is dependent primarily upon the density of the gas flowing through the density meter. The effect of variation of the temperature of the tube 11 can be rendered small for useful ranges of working conditions by the use of a suitable material for the tube 11.

In a gas-densitometer of the type shown in FIG. 1, the cylindrical wall 16 can be made as thin as two thousandths of an inch. The ferromagnetic alloy, of which the tube 11 is formed, is Ni-Span C 902.

Ni-span-C 902 is an iron-nickel-chromium alloy produced by the Huntingdon Alloy Products Division of the International Nickel Company, Incorporated, of Huntingdon, West Virginia and has the following limiting chemical composition:

Nickel (plus cobalt): 41.0 to 43.50 percent
Chromium: 4.90 to 5.75 percent
Titanium: 2.20 to 2.75 percent
Aluminium: 0.30 to 0.80 percent
Carbon: 0.06 maximum percent
Manganese: 0.08 maximum percent
Silicon: 1.00 maximum percent
Sulphur: 0.04 maximum percent
Phosporus: 0.04 maximum percent
Iron: Remainder.

Further details of the properties of Ni-Span-C 902 are given in Technical Bulleton T-31 of the Huntingdon Alloy Products Division.

The amplifier 19 is a conventional transistor amplifier encapsulated in thermoset synthetic resin such as Araldite 750/951 (trademark) or a ceramic material and includes a low-pass filter having a cut-off frequency below the second harmonic of the highest natural bell-like vibrations anticipated to arise in operation, the predominant frequency in the vibrations being in this embodiment the first harmonic, that is, the fundamental.

Although the embodiments described hereinbefore all include tubular hollow bodies of circular cross-section, other embodiments can be constructed having hollow bodies which are neither tubular nor of circular cross-section. However, tubular hollow bodies are found preferable. The hollow body of a preferred embodiment is shown in FIGS. 4 and 5. The hollow body comprises a flat tube 90 formed of ferromagnetic metal and having a pair of plane side walls 91 and a pair of curved edge walls 92, one end of the tube 90 being closed by a plane end wall 93. The side walls 91 are parallel to and opposite one another, and their widths are larger than their separation from one another. In operation, natural bell-like vibrations of the tube 90 are excited by means of an assembly including a drive coil 94 and two pick-up coils 95 and 96. The axes of the coils 94, 95 and 96 lie in a plane that contains the longitudinal axis of the tube 90 and is perpendicular to the side walls 91 and are perpendicular to the longitudinal axis of the tube 90. Each of the coils 94, 95 and 96 includes a respective biasing winding 97 and a respective signal winding 98 wound on an insulating former. A respective soft iron core is provided for each coil, the polarities established therein by the respective biasing windings in operation being indicated by the letters N and S representing respectively north and south poles. Two soft iron magnetic shunts 99 serve to shield the pick-up coils 95 and 96 from the magnetic field of the drive coil 94.

Further shielding is provided by virtue of the orientation of the polarities of the pick-up coils 95 and 96, the biasing fields of which link together through the side walls 91 of the tube 90 to form a magnetic circuit. Three DC sources (not shown) are coupled to the three biasing windings 97, respectively through conductors (not shown) embedded within the said assembly in the body 23' of synthetic thermoset resin.

The output circuit of an amplifier (not shown) is coupled to the signal winding 98 of the drive coil 94, the input circuit of the amplifier being coupled to the signal windings 98 of the pick-up coils 95 and 96. Natural bell-like vibrations of the tube 90 can be excited and maintained by feedback from the signal windings 98 of the pick-up coils 95 and 96, which sense vibration of the side walls 91, through the amplifier to the signal windings 98 of the drive coil 94.

The space between the body 23' and the internal surfaces of the walls 91, 92 and 93 of the tube 90 is filled with air, and tube 90 is, in operation, so immersed in a liquid of which the density is to be measured that the outer surfaces of the walls 91, 92 and 93 are covered by the liquid. The walls of the tube 90 are sufficiently thick for changes in the pressure difference across the walls to be negligible so far as changes in the predominant frequency of the natural bell-like vibrations are concerned. A frequency meter (not shown) is also coupled to the output circuit of the amplifier for indicating the frequencies of the vibrations.

FIG. 6 shows another embodiment that includes a tube 100 formed of ferromagnetic metal and having a non-circular cross-section similar to the tubes shown in FIGS. 4 and 5. The ends of the tube 100 are secured in metal mounting blocks, one of which is shown at 101. The mounting blocks provide inlet and outlet ports to the interior of the tube 101, which in operation is filled with a liquid the density of which is to be measured.

A drive coil 102 has a core comprising a short permanent bar magnet 103 provided with soft iron pole pieces 104, the pole piece of the north pole of the magnet 103 being indicated by the letter N and the pole piece of the south pole of the magnet being indicated by the letter S. The core of the drive coil 102 is so mounted that the ends of the pole piece 104 remote from the magnet 103 are adjacent the midpoints of the plane side walls of the tube 100, one-half of the tube 100 being shown in FIG. 6.

A pick-up coil 105 having a core 106 similar to the core of the drive coil 103 is so mounted between the drive coil 103 and the mounting block 101 that the ends of the core 106 lie in a plane containing the longitudinal axis of the tube 100. The pole pieces of like poles of the permanent magnets of the cores are situated on the same side of the tube 100. In operation, natural bell-like vibrations of the tube 100 are excited and maintained by feedback from the pick-up coil 105 to the drive coil 103 through an amplifier (not shown) and the frequency of the vibrations is indicated by a frequency meter (not shown) coupled to the output circuit of the amplifier, as in the embodiment shown in FIG. 4 of the parent application, now U.S. Pat. 3,516,283. The walls of the tube 100 are sufficiently thick for changes in the difference in pressure across the walls to be negligible, as in the embodiments shown in FIGS. 4, 5, and 9 of the foregoing parent case.

An advantage of the non-circular cross-section of the tubes 90 and 100 is shown in FIGS. 5 and 6 in comparison with tubes of circular cross-section in that the predominant frequency of the natural bell-like vibrations of the tubes of such non-circular cross-section is more sensitive to variations in the density of the liquid.

Referring again to FIG. 1, embodiments can be constructed substantially as shown in FIG. 1 but having a hollow body with a cross-section as shown in FIG. 5, the body 23 being replaced by the body 23', shown in FIG. 4, modified by the inclusion of the tubes 35 and 36. The DC sources for supplying the biasing windings 97 in such embodiments can be encapsulated with an amplifier in the same manner as the amplifier 19 shown in FIG. 1, and the thickness of the walls 91 and 92 of the tube 90 can be substantially less than is the case in embodiments in which the fluid is brought into contact with either an external or an internal surface only of the tube.

Other embodiments of the present invention can be constructed having means for exciting natural bell-like vibrations in a hollow body comprising, for example, magneto-strictive apparatus or a mechanical striking mechanism that excites damped vibrations which are allowed to die away, the hollow body being struck once for each frequency reading required.

Furthermore, embodiments can be constructed in which the means for exciting natural bell-like vibrations of the hollow body comprise a variable-frequency electrical oscillator having its output coupled to the hollow body. In such an embodiment the means for generating a signal representative of the predominant frequency of the vibration can comprise the variable-frequency electrical oscillator, which may be calibrated to read directly in density units. In operation, the frequency of the variable-frequency oscillator is varied until means for sensing the amplitude of the vibrations of the hollow body indicate a maximum in the amplitude. the frequency at which this occurs being the predominant frequency of the natural bell-like vibrations.

Although in the embodiments described with reference to the drawings natural bell-like vibrations are excited, further embodiments can be constructed in which other modes of natural vibration are excited such as natural transverse vibrations, natural longitudinal vibrations, and natural flexival vibrations. Furthermire, embodiments in accordance with the invention can be constructed in which a frequency other than the predominant frequency of the natural vibrations is measured, such frequency being by virtue of the construction and operation of embodiment rendered insensitive to variations in differential pressure.

For the purpose of determining the thickness of wall sufficient to render a frequency of the natural vibrations of a hollow body substantially insensitive to variations in differential pressure, use may be made of the equation $$f^2 = f_o^2 \times \frac{(1 + p/p_o)}{\left(1 + \frac{D}{D_1}\right)\left(1 + \frac{D^1}{D_2}\right)}$$

where $f$ is the resonant frequency of the hollow body,
$f_o$ is a constant,
$p$ is the differential pressure taken to be positive when acting from the interior to the exterior of the hollow body,
$p_o$ is a constant dependent upon the size, shape, and material forming the hollow body,
$D$ is the density of the fluid within the hollow body acting on the wall,
$D^1$ is the density of the fluid outside the hollow body acting on the wall, and
$D_1$ and $D_2$ are constants dependent upon the dimensions, material and shape of the hollow body.

The dependence of the constants $p_o$, $D_1$, $D_2$ on the thickness of the wall can be determined empirically.

Thus it is possible to determine the required thickness of a wall of an embodiment in which the fluid of which the density is to be measured is applied to the interior or to the exterior only of the hollow body, and the range of pressure over which a frequency of the hollow body is substantially insensitive to variations in the differential pressure.

I claim:

1. Apparatus for measuring the density of a fluid comprising, a non-circular vibratory tube of magnetic material elongated along a longitudinal axis, said tube including a pair of spaced parallel planar side walls of essentially rectangular configuration and a pair of curved opposed end walls, said end walls extending between and connecting to said planar side walls to form said tube into a continuous hollow body, means for supporting said tube with a predetermined region thereof in contact with said fluid, drive coil means generating magnetic poles for exciting natural vibrations of said tube, and pick-up coil means for generating a signal representative of a frequency of said vibrations, said drive coil means and said pick-up coil means each having an axis through the generated poles, said pole axes being parallel to one another and lying in a plane perpendicular to said planar side walls and containing said longitudinal axis, said predetermined region including at least part of a wall of said tube which is of sufficient thickness that the frequency of tube vibration is substantially insensitive to variations in differential pressures exerted against said tube wall by said fluid.

2. Apparatus as defined in claim 1 wherein said pick-up coil means includes two separate pick-up coils disposed on opposite sides of said drive coil means, wherein means are coupled to different ones of said two pick-up coils for establishing a magnetic circuit in each of said pick-up coils, and wherein magnetic shielding means are positioned between said drive coil means and each of said pick-up coils to magnetically shield said pick-up coils from said drive coil means.

3. Apparatus as defined in claim 1, which further comprises a body of coil-supporting material disposed within said tube and spaced from the walls thereof, and wherein the drive and pick-up coil means are mounted within said body.

4. Apparatus as defined in claim 1, wherein the drive and pick-up coil means are mounted externally of said tube and wherein said fluid flows through the interior of said tube.

5. Apparatus as defined in claim 1, wherein the drive and pick-up coil means each includes a pair of spaced parallel pole pieces, said pole pieces also being parallel to and disposed exteriorly of said planar side walls of said tube.

References Cited
UNITED STATES PATENTS

| | | | |
|---|---|---|---|
| 2,635,462 | 4/1953 | Poole et al. | 73—32 |
| 3,444,723 | 5/1969 | Wakefield | 73—32 |
| 2,943,476 | 7/1960 | Bernstein | 73—32 |
| 3,021,711 | 2/1962 | Arvidson | 73—32 X |
| 3,218,851 | 11/1965 | Sipin | 73—32 X |
| 3,225,588 | 12/1965 | Moulin et al. | 73—32 |

RICHARD C. QUEISSER, Primary Examiner

E. J. KOCH, Assistant Examiner

U.S. Cl. X.R.

73—67.2